(12) United States Patent
Vitse et al.

(10) Patent No.: US 10,976,049 B2
(45) Date of Patent: Apr. 13, 2021

(54) HYBRID BOILER-DRYER AND METHOD

(71) Applicant: GENERAL ELECTRIC COMPANY, Schenectady, NY (US)

(72) Inventors: Frederic Vitse, West Hartford, CT (US); Carl D. Edberg, Stafford Springs, CT (US); Steven A. Unker, Simsbury, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 109 days.

(21) Appl. No.: 16/362,140

(22) Filed: Mar. 22, 2019

(65) Prior Publication Data
US 2020/0300454 A1 Sep. 24, 2020

(51) Int. Cl.
*F23K 1/04* (2006.01)
*F23K 3/02* (2006.01)
*F26B 3/00* (2006.01)

(52) U.S. Cl.
CPC .................. *F23K 1/04* (2013.01); *F23K 3/02* (2013.01); *F26B 3/00* (2013.01); *F23K 2201/10* (2013.01);
(Continued)

(58) Field of Classification Search
CPC .......... F23K 1/04; F23K 3/02; F23K 2201/30; F23K 2203/201; F23K 2201/10; F23K 2201/20; F26B 3/00
See application file for complete search history.

(56) References Cited

U.S. PATENT DOCUMENTS 4,245,570 A * 1/1981 Williams ................ C02F 11/12
110/204
4,417,528 A * 11/1983 Vining ....................... C10J 3/02
110/185
(Continued)

FOREIGN PATENT DOCUMENTS

CN 102 353 237 12/2013
CN 102353237 B 12/2013
(Continued)

OTHER PUBLICATIONS

F.Nazra Hameed, et al., "Using entrained flow pre-drying to improve the thermal efficiency of lignite power stations", Chemeca 2011 engineering a better world, Sydney, Sep. 2011.
(Continued)

*Primary Examiner* — David J Laux
(74) *Attorney, Agent, or Firm* — Grogan, Tuccillo & Vanderleeden, LLP (57) ABSTRACT

A method of operating a furnace having a firing system is disclosed. The method includes providing a solid fuel to a sieve; separating the fuel into a portion and a second portion; providing a first portion of a flue gas to a first fuel dryer comprising a first duct; providing the first portion of fuel to the first duct, and drying the first portion of fuel therein; conveying the first portion of fuel through the first duct to the furnace; burning the first portion of fuel with firing system; conveying the second portion of fuel and a second portion of the flue gas to a second fuel dryer in a lower portion of the furnace, providing the second portion of fuel to a mill; pulverizing the second portion of fuel with the mill; conveying the second portion of fuel to the furnace; and burning the second portion of fuel.

20 Claims, 5 Drawing Sheets

(52) U.S. Cl.
CPC ...... *F23K 2201/20* (2013.01); *F23K 2201/30* (2013.01); *F23K 2203/201* (2013.01)

(56) References Cited

U.S. PATENT DOCUMENTS

| | | | | |
|---|---|---|---|---|
| 4,502,397 | A | * | 3/1985 | Hochmuth .............. F22B 31/00 110/234 |
| 6,532,880 | B2 | * | 3/2003 | Promuto ................. C02F 11/12 110/101 R |
| 8,197,561 | B2 | * | 6/2012 | Dunlop ..................... C10L 9/08 44/620 |
| 8,579,999 | B2 | | 11/2013 | Bullinger et al. |
| 8,590,463 | B1 | * | 11/2013 | Higgins ................... F23K 1/04 110/118 |
| 9,964,303 | B2 | * | 5/2018 | Sullivan ................... F23G 5/04 |

FOREIGN PATENT DOCUMENTS

| | | |
|---|---|---|
| CN | 106813238 A | 6/2017 |
| CN | 106838885 A | 6/2017 |
| DE | 12 37 511 | 3/1967 |
| DE | 36 18 333 | 12/1987 |
| DE | 40 03 499 | 8/1990 |

OTHER PUBLICATIONS

Liu et al., "Thermodynamic analysis of pre-drying methods for pre-dried lignite-fired power plant", Energy, vol. 49, pp. 107-118, Jan. 1, 2013.

International Search Report issued in corresponding PCT Patent Application No. PCT/US2020/022888 dated Jun. 4, 2020.

* cited by examiner

FIG. 5

HYBRID BOILER-DRYER AND METHOD

TECHNICAL FIELD

Embodiments of the invention relate generally to solid fuel boilers and more specifically to a hybrid boiler-fuel dryer and method.

BACKGROUND

In conventional boilers, such as solid fuel boilers, organic materials are commonly used by industry and utilities to generate steam to operate equipment and to generate electricity. For example, electric utility power plants typically generate electric power by using steam to turn the shaft of a turbine to thereby drive an electric generator. Many power plants generate this steam by burning a solid fuel such as coal or biomass fuels. The fuel is burned in a furnace combustion chamber to produce heat that is then used to convert water to steam in a boiler. This steam is then superheated and directed to drive or rotate a steam turbine. The rotating turbines are coupled to alternators by a shaft or rotor to generate AC electricity therewith. After the steam has passed through the turbine, it is provided to a condenser and cooled by passing around pipes carrying cooling water, which absorb the heat from the steam. As the steam cools, it condenses into water which is then pumped back to the boiler to repeat the process of heating it into steam.

Conventional boilers often burn pulverized coal or biomass fuels which may have a high moisture content, for example from being stored outdoors and exposed to high humidity conditions. The moisture content of such high moisture content fuels may vary greatly, thereby introducing consequent variations into the combustion process and making it more difficult to efficiently operate the boilers. (As used herein, the term or "high moisture content fuel" is intended to mean and include any type of solid fuel suitable for burning in a furnace). The moisture content of solid fuels is known to have an effect on many aspects of boiler operation, including efficiency and emissions. Boilers burning high-moisture content fuel such as coal will exhibit a relatively low thermal efficiency due to the higher moisture content of the fuel. High moisture content in solid fuels can also lead to problems in areas such as fuel handling, fuel grinding, fan capacity, and flue gas flow rate.

Additionally, in boilers burning high moisture content fuels, efficient suspension or tangential firing is also affected by the relative moisture content and particle size distribution of the fuel. If the moisture content of the fuel is sufficiently high, the combustion of the fuel in the combustion chamber may be slowed or delayed, resulting in unburnt combustible material being carried out with the flue gas. Further, if a particle size of the pulverized solid fuel is sufficiently large, the larger fuel particle size will make it difficult to maintain the fuel particles in suspension in the combustion chamber, thereby reducing the residence time the particle spends at a high temperature to complete the combustion of the entire particle. Accordingly, to achieve desired combustion efficiencies in tangential fired boilers, the high moisture content fuel must be sufficiently dried and sized. Specifically, for efficient combustion in conventional boilers, both the particle size and moisture content of the fuel must be addressed (i.e., minimized) in a fuel pretreatment system. Typically, a drier apparatus is employed prior to combustion to pre-treat (that is, by heating) the high moisture content fuels to reduce the moisture content and enhance the BTU production of the fuel.

Some conventional boilers attempt to circumvent the challenge of combusting fuel comprising relatively large and moist particles, by employing a semi-suspension system. In such a system, relatively large fuel particles (e.g., greater that 25 mm diameter) are fed to a grate at the bottom of the boiler, while the relatively smaller particles, referred to as "fines" are screened during pretreatment and partially dried in a separate pulverizer drier prior to being fired in suspension. Typically, for conventional semi-suspension systems, a particle moisture content of 55% and a maximum particle size of less than 40 mm is required (90% at <25 mm). Use of these larger particle size, higher moisture content fuels typically requires the boiler to be at a heat input of greater than 50% maximum continuous rating (MCR). As used herein, "MCR" is the capability of a steam boiler to produce and provide a predetermined quantity of steam continually and easily without deficit or unwanted effects such as overloading, slagging, or overheating.

However, with fuel pretreatment of moist fuel (for example, to achieve a moisture below 40% (i.e., essentially no surface water) with particle sizes of 96% less than 10 mm, and 99% less than 20 mm), suspension firing at a heat input of more than 10% MCR is feasible, thus making efficient operation at low loads achievable. Additionally, with pulverized and dried fuels, suspension firing is achievable without load limitation for up to 25% moisture content in fuels having particles sized to 85% less than 1 mm. However, such conventional fuel pretreatment results in an undesired and substantial parasitic load on the boiler. For example, while relatively small particle sizes (typically less than 2 mm), a residence time of a few seconds may be sufficient for drying to 20% moisture, for larger particle sizes residence times of minutes may be necessary for effective drying. However, for conventional driers to be economically viable for fuel drying prior to pulverizing, it preferably would have a residence time of few seconds or less so this can be done while the particles are pneumatically conveyed to the furnace. However, the corresponding heat and mass transfer rates in such a drier can typically only be achieved using a fluidizing or entrained reactor with a fuel particle size of 1 mm or less. Achieving such particle sizes with a conventional coal mill has been cost prohibitive in terms of milling power. Additionally, the energy expenditure required to grind the fuel increases significantly as the moisture content of the fuel rises from 20% to 40% and above.

Accordingly, it would be desirable to have a boiler that operates with a reduced parasitic load associated with the simultaneous sizing and drying of high moisture, large particle size fuel prior to firing and achieve a corresponding combustion efficiency and load flexibility.

BRIEF DESCRIPTION

In an embodiment, a hybrid boiler-dryer for drying and burning particles of a solid fuel, is disclosed. The hybrid boiler-dryer includes a furnace having a firing system to combust the particles of the solid fuel and create a flue gas, a flue to receive the flue gas, and a sieve to separate the particles of solid fuel into a first portion of fuel and a second portion of fuel based on a size of the particles of the solid fuel, wherein the size of the particles in the first portion of fuel are smaller than a predetermined size, and the size of the fuel particles in the second portion of fuel are larger than a predetermined size. The hybrid boiler-dryer also includes a first fuel-dryer portion comprising a first duct arranged to receive the first portion of fuel therein and to convey the first portion of coal therethrough to the furnace for burning by the firing system, the first duct arranged to receive a first portion of the flue gas from the flue to dry the first portion of coal, and a second fuel dryer portion disposed in the furnace including a grate disposed in a lower portion of the furnace. The hybrid boiler-dryer includes a second duct to receive a second portion of the flue gas and to convey the second portion of flue gas to the second fuel dryer portion, a second conveyor to convey the second portion of fuel to the second fuel dryer portion within the furnace, a third conveyor to convey the second portion of fuel from second fuel dryer portion to a mill, the mill disposed outside the furnace and configured to reduce a size of the particles of the second portion of fuel, and a fourth conveyor configured to provide the second portion of fuel from the mill to the furnace for burning by firing system.

In another embodiment, a method of operating a furnace having a firing system configured to combust particles of a solid fuel received therein and thereby create a flue gas, is disclosed. The method comprises the steps of providing the particles of solid fuel to a sieve, separating the solid fuel into a first portion of fuel and a second portion of fuel based on a size of the particles of the solid fuel, wherein the size of the particles in the first portion of fuel are smaller than a predetermined size, and the size of the fuel particles in the second portion of fuel are larger than a predetermined size, directing a flue gas through a flue, providing a first portion of the flue gas to a first fuel-dryer comprising a first duct in fluid communication with the flue, conveying the first portion of fuel to the first duct, drying the first portion of fuel therein the first duct, conveying the first portion of fuel through the first duct to the furnace, combusting the first portion of fuel with firing system, conveying the second portion of fuel to a second fuel dryer disposed within a lower portion of the furnace, conveying a second portion of the flue gas to the second fuel dryer portion, drying the second portion of fuel with the second fuel dryer portion, conveying the second portion of fuel from the second fuel dryer portion within the furnace to a mill disposed outside of the furnace, reducing the size of the particles of the second portion of fuel with the mill, conveying the second portion of fuel from the mill to the furnace, and combusting the second portion of fuel with firing system.

BRIEF DESCRIPTION OF THE DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

While the embodiments disclosed herein are primarily described with respect to solid fuel boilers, it is to be understood that embodiments of the present invention may be applicable to other apparatus and/or methods that benefits from the teachings herein. While coal as a fuel fired in the boiler furnace of an electric power plant shall generally be referred to herein as an exemplary particulate material for purposes of this application, it will be appreciated that any other solid material that constitutes a useful or beneficial input to an industrial operation may be used as well.

Figure 1:
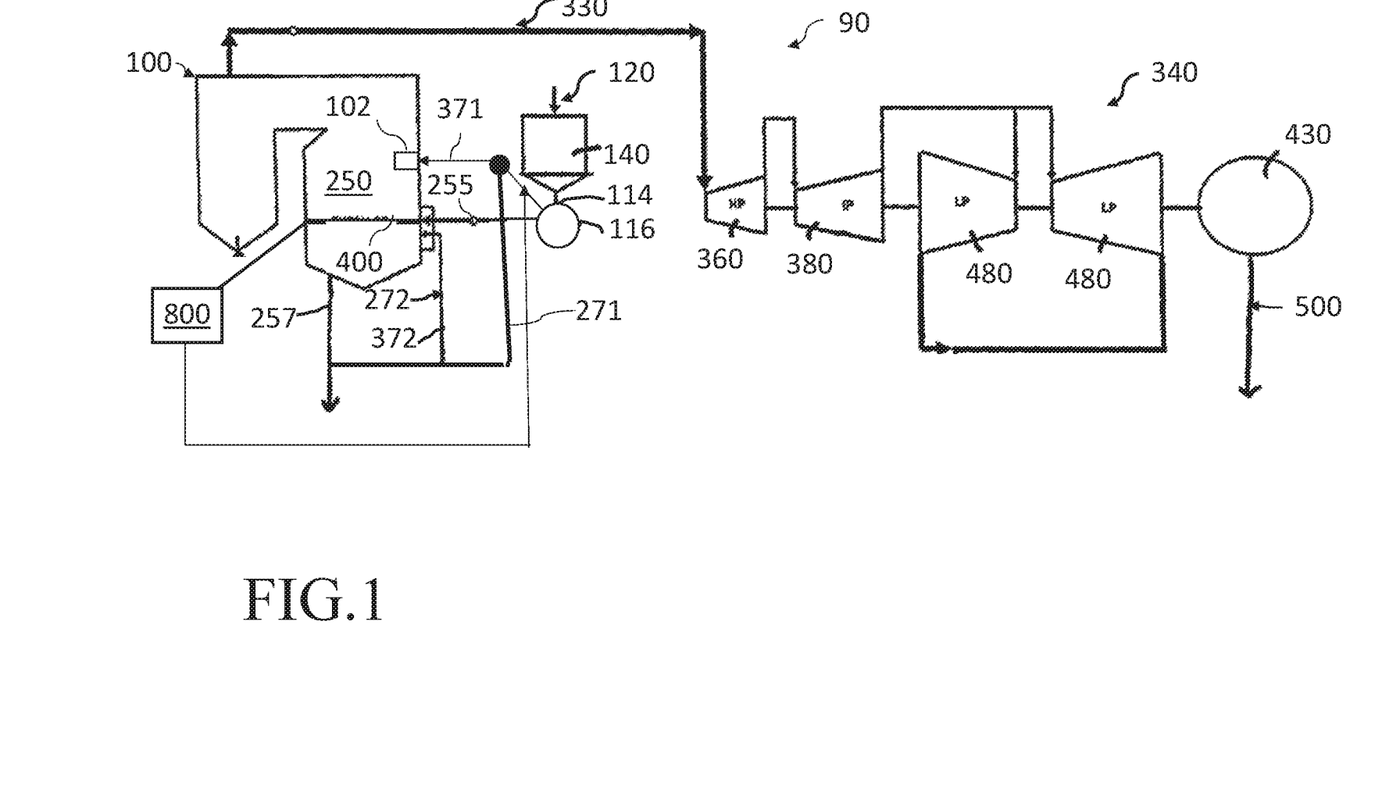
FIG. 1 is a schematic diagram of an embodiment.

Referring to FIG. 1, a schematic diagram of an embodiment of a solid-fuel type power plant 90 for the generation of electricity is shown. The power plant 90 is operative to increase the temperature and pressure of a gas to drive one or more turbines. The rotating turbines are coupled to alternators by a shaft or rotor to generate AC electricity therewith.

The power plant 90 comprises a boiler 100 which includes a furnace 250 configured to burn a solid fuel 120 therein. As will be described in more detail herein, the solid fuel 120 in particulate form is fed from a storage area 140 such as a coal bunker to the boiler 100 in which it is combusted to produce heat.

The furnace 250 is operative to ignite and combust the solid fuel 120 in a known manner. For example, in an embodiment, the boiler 100 may employ a conventional firing system 102 such as a suspension firing system to combust the fuel 120. Other embodiments may include other types of conventional furnace firing systems 102 without departing from the scope of the claims herein. In some embodiments, the furnace 250 may include a conventional back-pass portion 252.

Figure 2:
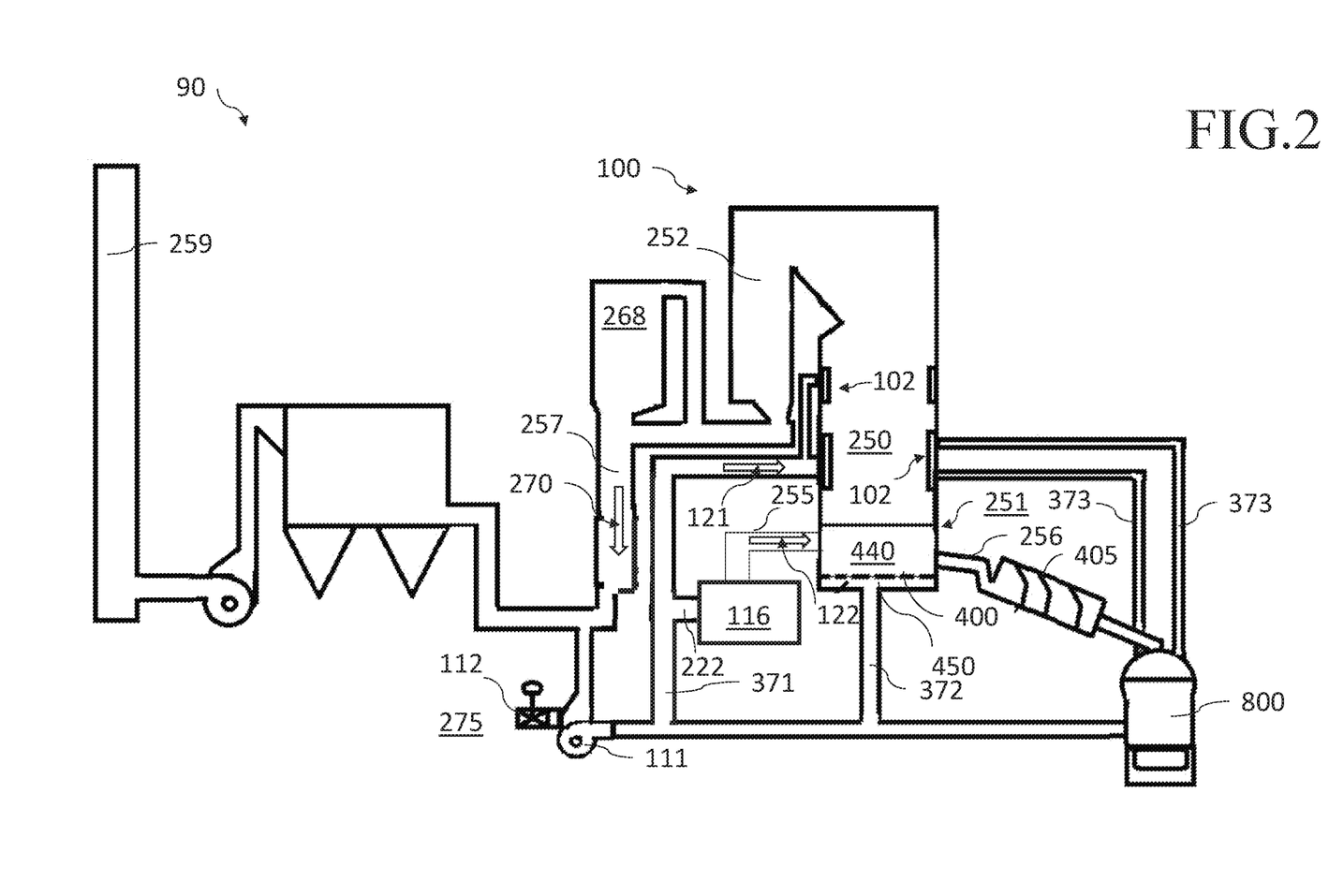
FIG. 2 is a schematic diagram of an alternative embodiment.

As depicted in FIG. 2, during operation, a relatively hot flue gas 270 is produced by the combustion of the fuel 120 in the furnace 250 and provided to a flue 257 and vented therefrom, for example via an exhaust stack 259 (FIG. 2). In various embodiments, flue 257 may be defined by one or more ducts arranged to receive the hot flue gas 270 produced in furnace 250. As described in more detail herein, at least a first portion 271 and a second portion 272 of the hot flue gas 270 may be extracted from the flue 257 and recycled to enable the operation of the various embodiments described herein.

Figure 3:
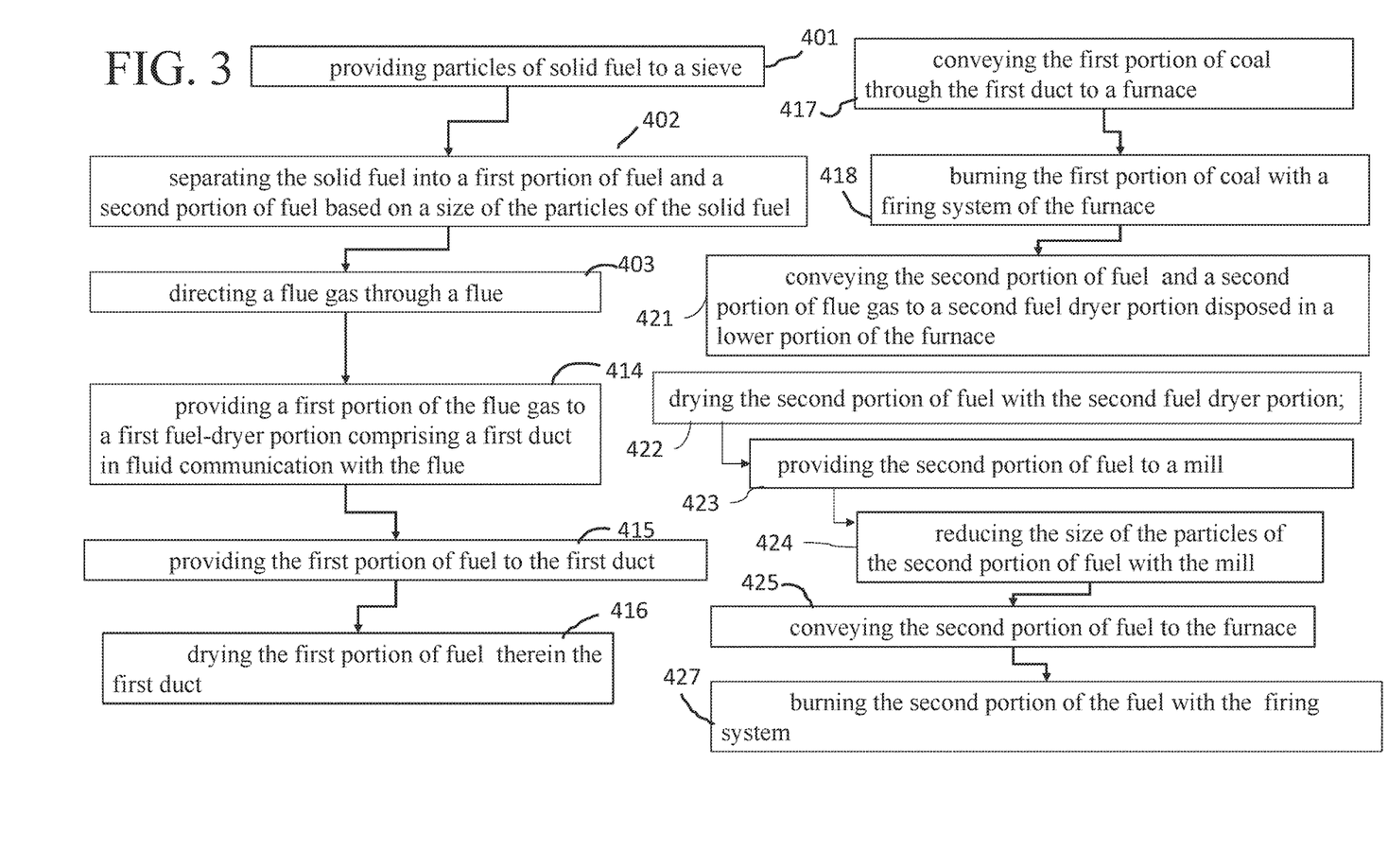
FIG. 3 is a flow diagram according an embodiment of a method.

Additionally, as depicted in FIG. 3, in some embodiments, one or more pollution control devices may be arranged to receive the hot flue gas 270 from the flue 257. For example, a scrubber 268, such as a conventional wet scrubber, may be arranged in fluid communication with the flue 257 to receive the flue gas 270 therefrom to extract pollutants such as sulfur compounds, oxides of sulfur (e.g., sulfur dioxide) and ash particles from the flue gas 270 prior to extracting and recycling the first and second portions 271, 272 of the flue gas 270.

The boiler 100 further comprises a hybrid boiler-dryer 900. As shown, embodiments of the hybrid boiler-dryer 900 include a first fuel dryer 901, and a second fuel dryer 902. In an embodiment, the first fuel dryer 901 may comprise in-suspension fuel dryer, and the second fuel dryer 902 may comprise an on-grate fuel dryer. As used herein the term, "fuel dryer" means any apparatus that is useful for the reduction of the moisture content of a particulate material through the application of direct or indirect heat, including but not limited to a fluidized bed dryer, vibratory fluidized bed dryer, fixed bed dryer, traveling bed dryer, cascaded whirling bed dryer, or elongated slot dryer.

During operation, the heat produced by the normal combustion reaction of burning fuel 120 within the furnace 250, in turn, heats and converts water in tubes (not shown) into steam 330, which is delivered to steam turbine 340. In some embodiments, steam turbine 340 may comprise a plurality of turbines, such as a high-pressure steam turbine 360, intermediate-pressure steam turbine 380, and low-pressure steam turbines 480 operatively connected in series. The steam 330 performs work by pushing against the fanlike blades (not shown) connected to a series of wheels (not shown) contained within each turbine 340, 360, 380 which are mounted on a shaft (not shown). As the steam 330 pushes against the blades (not shown), it causes both the wheels and turbine shaft to spin. This spinning shaft turns the rotor of electric generator 430, thereby producing electricity 500. Steam 330 leaving the steam turbine 360 is delivered to condenser (not shown) in which it is cooled by means of cooling water to convert the steam back into water.

Figure 4:
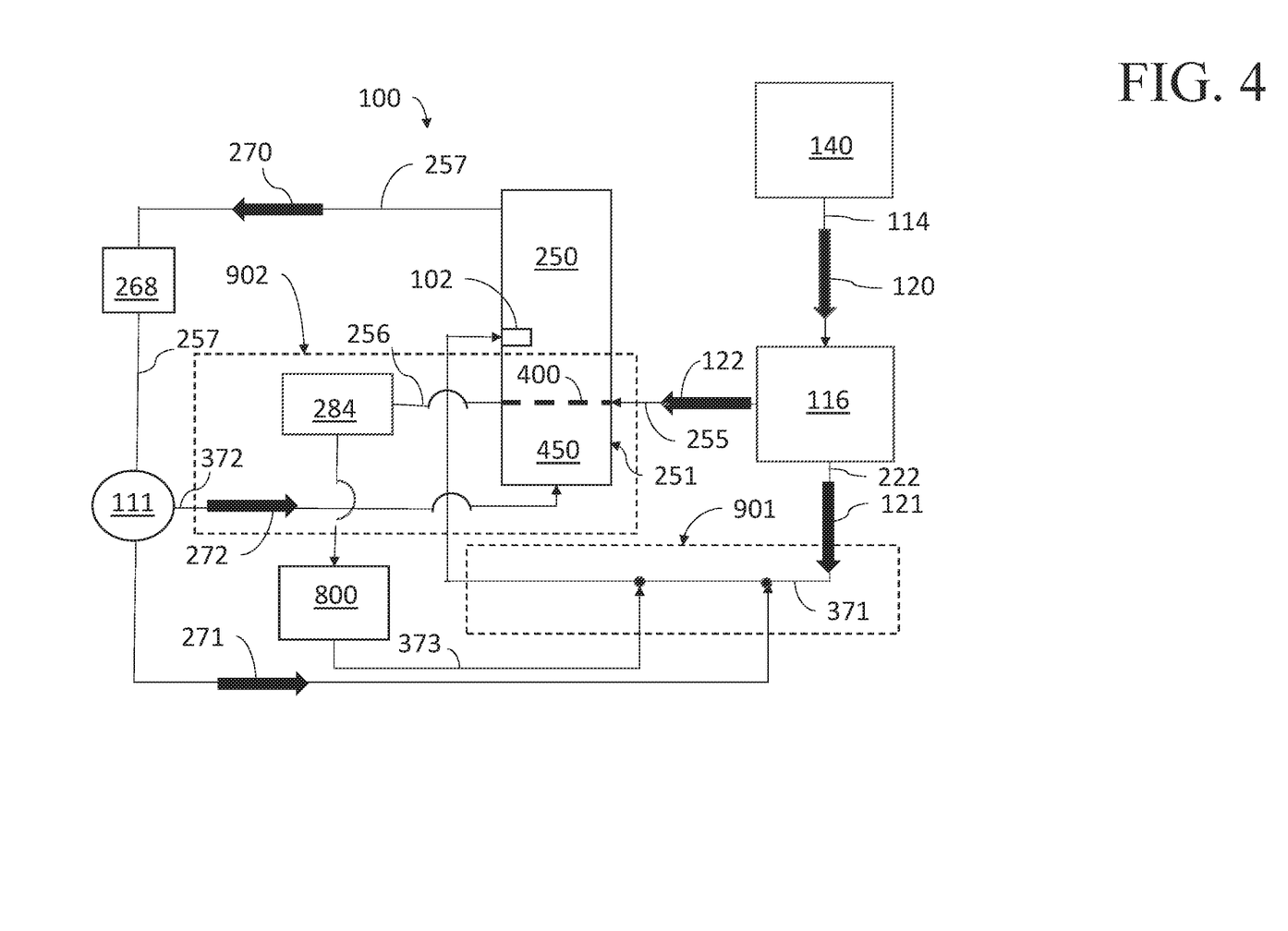
FIG. 4 is a schematic diagram according to an embodiment.

In the embodiment depicted in FIG. 2 and FIG. 4, the solid fuel 120, (such as relatively high-moisture content raw coal), may be collected in the storage area 140 such as a coal bunker until needed. The high-moisture content fuel 120 will comprise a first portion 121 of fuel (as indicated in FIG. 4 by arrow 121) defining relatively small particle sizes, or "fines" (e.g., less than 25 mm diameter), and a second portion of fuel 122 (as indicated in FIG. 4 by arrow 122) defining relatively large particle sizes, that are coarser or larger (e.g., at least 25 mm diameter) than the relatively fine or small particle sizes defined by the first portion 121. In an embodiment, the first portion of fuel 121 further defines predetermined particle sizes that are appropriate for burning by the firing system 102 without need of milling or other steps to reduce the particle sizes within the first portion of fuel 121; and the second portion of fuel 122 defines predetermined particle sizes that need milling or other steps to reduce the particle sizes within the second portion of fuel 122 to enable burning by firing system 120.

During operation, the raw fuel 120 is provided or conveyed using a conventional conveyor device 114 to a filter or sieve 116 for screening. The sieve 116 is operative to separate the first portion of fuel 121 from the second portion of fuel 122 based on the relative particle sizes of the first and second portions of fuel 121, 122. In various embodiments, the sieve 116 may comprise a roller screen. In other embodiments, the sieve 116 may comprise one or more of a centrifuge, trommel screener, vibratory screener, screw feeder, and rotating drum feeder. In other embodiments, any desired sieve 116 device may be used to separate the first portion of fuel 121 from the second portion of fuel 122 that enables the furnace to operate as described herein without departing from the scope of the claimed subject matter.

Once the first portion of fuel 121 is filtered or separated from the second portion of fuel 122 by the sieve 116, the first portion of fuel 121 may then be provided to the firing system 102 of furnace 250 for burning via the first fuel-dryer 901. In an embodiment, the first fuel-dryer 901 comprises a first channel or duct 371 through which the first portion of fuel 121 is conveyed by a flow of the first portion of the flue gas 271. For example, in an embodiment, the first duct 371 is configured to receive the first portion of coal 121 directly from the sieve 116. In other embodiments, the first duct 371 is configured to receive the first portion of coal 121 from a first conveyor 222 such as a pressurized duct coupled in fluid communication therebetween the first duct 371 and the sieve 116. In other embodiments, the first conveyer 222 may be a mechanical type first conveyor 222 such as a belt conveyor or chute, or any other conventional conveyor that enables the first portion of coal 121 to be received by the first duct 371 from sieve 116. Additionally, the first duct 371 is arranged in fluid communication with the flue 257 to receive the first portion of the flue gas 271 therefrom. The first portion of the flue gas 271 flows through the first duct 371 to thereby convey the first portion of fuel 121 therethrough to the furnace 250 for burning by firing system 102. The first portion of flue gas 271 may be provided using a first air fan 111, such as a primary air fan, in fluid communication with first duct 371. In some embodiments, the first air fan 111 may comprise a flue gas recirculation fan.

In this way, in the first fuel dryer 901, comprising the first duct 371, the heat from the recycled first portion of flue gas 271 is advantageously used to further dry the first portion of fuel 121 while in suspension within the first duct 371 prior to combustion in the furnace 250, for example by suspension or tangential firing.

Once the second portion of fuel 122 is filtered or separated from the first portion of fuel 121, the second portion of fuel 122 may be further dried and sized before being provided to the firing system 102 for burning in furnace 250. The second portion of fuel 122 is dried by the second fuel dryer 902. For example, the second fuel dryer 902 may comprise a grate 400 having openings (not shown) defined therethrough and configured to receive the second portion of fuel 122 thereon and disposed within a lower portion 251 of furnace 250 proximal the firing system 102. The second portion of fuel 122 is conveyed to the furnace 250 from sieve 116 and disposed on the grate 400 by a second conveyor 255, such as a conventional mechanical belt-type conveyor. In other embodiments, the second conveyor 255 may comprise a pressurized duct. During an operation of the furnace 250, while the second portion of fuel 122 is on grate 400, the second portion of fuel 122 is thereby exposed to heat and a reducing environment due to the combustion occurring in the furnace 250, as well as being fluidized by the oxygen deficient exhaust gas stream 272, whereby the second portion of fuel 122 is at least partially devolatilized and dried in a known manner. As will be appreciated, the second portion of fuel 122 disposed on the grate 400 defines a bed region 440 wherein fluidization occurs. For example, the bed region 440 may comprise one of a fixed bed, fluidized bed, a bubbling fluidized bed, or sluggish fluidized bed.

Figure 5:
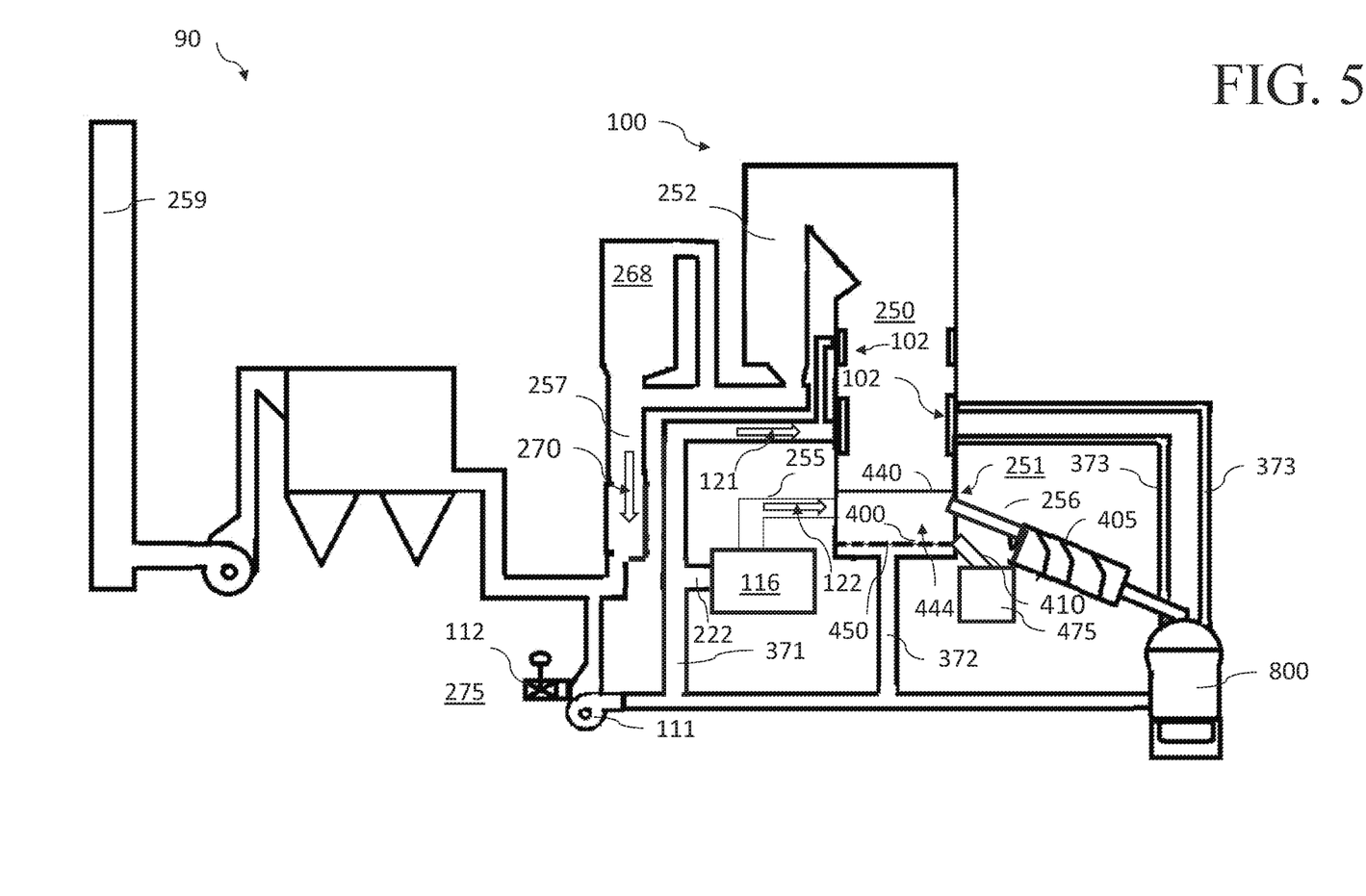
FIG. 5 is a schematic diagram of yet another an alternative embodiment

Additionally, ash particles produced by the combustion in furnace 250 and present in the bed region 440 may be separated from the second portion of fuel 122. For example, in some embodiments, such as depicted in FIG. 5, the fixed bed region 440 is coupled in fluid communication with an ash separator 444, whereby the relatively heavier ash particles in the second portion of fuel 122 migrate to the bottom of the bed region 440, and are captured for disposal in an ash receptacle 475 coupled via outlet 410 in fluid communication with the bottom of the bed region 440. Conversely, the relatively lighter ash and fuel particles within the second portion of fuel 122 may remain toward the upper part or top of the bed region 440 and provided therefrom to an ash cooler 405, such as a rotary ash cooler, prior to being conveyed to the mill 800. In an embodiment, a residence time (i.e., the period of time that the second portion of fuel 122 remains in the bed 440 in furnace 250), may be based on a predetermined time period. In other embodiments, the residence time of the second portion of fuel 122 in bed 440 may be determined based on the desired properties of the second portion of fuel 122, such as a predetermined moisture content. When the desired properties of the second portion of fuel 122 are met, and/or when a predetermined residence time of the second portion of fuel 122 on grate 400 is met, the second portion of fuel 122 is then removed or extracted from bed 440.

In an embodiment, a second channel or duct 372 is arranged in fluid communication with the flue 257 and configured to receive a second portion 272 of the flue gas exiting the furnace 250 therethrough. The second portion of flue gas 272 is directed via the second duct 372 to the second fuel dryer 902 to fluidize the second portion of fuel 122 disposed in the bed 440. Some embodiments may comprise any number of second ducts 372 to convey the second portion of flue gas 272 to the second fuel dryer 902.

In an embodiment, the second portion of flue gas 272 may be provided to a plenum 450 disposed beneath and proximal grate 400. The second portion of flue gas 272 may be provided through second duct 372 using a fan such as the first air fan 111. In other embodiments, a second air fan (not shown) may be used in lieu of, or in conjunction with the first air fan 111.

In an embodiment, an additional gas 275, such as ambient air may be drawn in through a valve 112 or damper in cooperation with the first air fan 111, and added to the second portion of flue gas 272 to adjust or control the flowrate and oxygen content of the second portion of flue gas 272 delivered to fluidize the second portion of fuel 122 on the bed 440. In this way, the temperature, gas velocity, and chemical composition of the fluidizing gas (i.e., the second portion of flue gas 272) for the fuel (i.e., the second portion of fuel 122) above the grate 400 can be controlled.

When extracted from grate 400, the second portion of fuel 122 is then conveyed to a mill or pulverizer 800 to be milled (i.e., to mechanically reduce the particulate size of the fuel 122), and thereafter re-introduced into the furnace 250 to be combusted therein. The second portion of fuel 122 is conveyed out of the furnace 250 to the pulverizer by third conveyor 256, which may be a pressurized duct. In other embodiments, the third conveyor 256 may alternatively comprise a conventional mechanical belt-type conveyor, or a chute. In some embodiments, prior to conveyance from the furnace 250 to the pulverizer 800, the second portion of fuel 122 may be conveyed via the third conveyer 256 to a dryer device 284, such as a conventional carbon separator and/or a heat exchanger, for further optimization (i.e., reduction) of moisture content and ash removal, prior to conveyance to, and sizing by, the pulverizer 800. Still other embodiments may omit the dryer device 284 and convey the second portion of fuel 122 via the third conveyor 256 directly from the furnace 250 to the pulverizer 800 to be milled. After milling in pulverizer 800, the second portion of fuel 122 is then conveyed to the furnace suspension firing system 102 to be burned.

In an embodiment, the second portion of fuel 122 may be conveyed from pulverizer 800 and provided to first duct 272 for conveyance, along with the first portion of fuel 121, to the firing system 102. In other embodiments, the second portion of fuel 122 may be conveyed from pulverizer 800 (i.e., outside of the furnace 250) via a fourth conveyor 373. to the firing system 102 (i.e., inside the furnace) separately from the first portion of fuel 121 in first duct 371. For example, in embodiments wherein the mill 800 may be a beater wheel type mill, the fourth conveyor 373 may comprise a pressurized channel or duct 373 arranged in fluid communication with the mill 800 to receive the second portion of fuel 122 therefrom utilizing the pressurized air blowing from the mill 800. In other embodiments the fourth conveyor 373 may comprise a fourth duct 373 in fluid communication with a fan (not shown) such as a conventional secondary air fan to pressurize the air in the fourth duct 373 to cooperatively convey the second portion of fuel 122 from the mill 800 through the fourth duct 373 to the firing system 102 in furnace 250. Still other embodiments may use any number of mechanical conveyors arranged to define the fourth conveyor 373 to convey the second portion of fuel 122 to the firing system 102 in the furnace 250. As depicted in FIG. 2, some embodiments may comprise a fourth conveyor 373 comprising any number of fourth ducts to convey the second portion of fuel 122 from the pulverizer 800 to the firing system 102.

Referring to the system described in FIG. 1, the boiler 100 may be started as a conventional semi-suspension system. However, when the temperature of the furnace has reached a predetermined or desired level (for example, when the amount of heat input on the grate 400 can be reduced without detrimental effect on boiler performance), the second portion of the flue gas 272 is recirculated, and a devolatilization and a drying of the second portion of fuel 122 on grate 400 is initiated. The second portion of fuel 122 is then extracted from the furnace 250 with the preferred moisture content to be sized in pulverizer 800 (with a relatively low parasitic load due to the lower moisture content), and then re-injected in the furnace 250 through the suspension firing system 102. In this way, the heat input is shifted to the suspension firing system 102, thus giving more flexibility to quickly adjust to any change in load demand.

In an embodiment, a method of operating a furnace having a firing system configured to combust particles of a solid fuel received therein, is provided. The method comprises at step 401 providing the particles of solid fuel to a sieve, at step 402 separating the solid fuel into a first portion of fuel and a second portion of fuel based on a size of the particles of the solid fuel, wherein the size of the particles in the first portion of fuel are smaller than a predetermined size, and the size of the fuel particles in the second portion of fuel are larger than a predetermined size, at step 403 directing a flue gas through a flue, at step 414 providing a first portion of the flue gas to a first fuel-dryer comprising a first duct in fluid communication with the flue, at step 415 conveying the first portion of fuel to the first duct, at step 416 drying the first portion of fuel therein the first duct, at 417 conveying the first portion of fuel through the first duct to the furnace, and at 418 combusting the first portion of fuel with firing system. The method further includes at step 421 conveying the second portion of fuel to a second fuel dryer disposed within a lower portion of the furnace and conveying a second portion of the flue gas to the second fuel dryer portion, at 422 drying the second portion of fuel with the second fuel dryer portion, at step 423 conveying the second portion of fuel from the second fuel dryer portion within the furnace to a mill disposed outside of the furnace, at step 424 reducing the size of the particles of the second portion of fuel with the mill, at step 425 conveying the second portion of fuel from the mill to the furnace, and at step 427 combusting the second portion of fuel with firing system.

In the above described embodiments, the second portion of the fuel 122 is fed to the boiler 250 on the grate 400 and exposed to a reduced atmosphere, for a predetermined residence time with low gas velocity such that volatile matter and is released from the fuel 122. A technical effect of these embodiments is that biomass ash entrainment away from the grate 400 is limited by low gas velocities thus reducing the tendency for plugging or fouling downstream of the furnace 250.

A technical effect of the above described embodiments is that by re-circulating the flue gas, controlling the reducing environment in the lower section of the furnace, and suspension firing of dried fuel allows for a better control of NOx emissions.

Therefore, according to the claimed subject matter, the boiler comprises a hybrid dryer with a residence time adapted to larger size, high moisture moist fuel particles. Using the hot flue gas to pre-dry the fuel prior to pulverizing enables the removal of moisture without requiring expensive heat transfer equipment such as conventional rotary and fluidized bed dryers.

While the dimensions and types of materials described herein are intended to define the parameters of various embodiments, they are by no means limiting and are merely exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "above," "below," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A hybrid boiler-dryer for drying and burning particles of a solid fuel, comprising:
   a furnace including a firing system configured to combust the particles of the solid fuel and thereby create a flue gas;
   a flue in fluid communication with the furnace arranged to receive the flue gas therethrough;
   a sieve operative to receive the particles of the solid fuel and to separate the particles of the solid fuel into a first portion of solid fuel particles and a second portion of solid fuel particles based on a size of the particles of the solid fuel, wherein the size of the particles in the first portion of solid fuel particles are smaller than a predetermined size, and the size of the particles in the second portion of solid fuel particles are larger than a predetermined size;
   a first fuel-dryer portion comprising a first duct arranged to receive the first portion of solid fuel particles therein and to convey, via a first conveyor, the first portion of solid fuel particles therethrough to the furnace for burning by the firing system, the first duct arranged in fluid communication with the flue to receive a first portion of the flue gas therefrom to dry the first portion of solid fuel particles;
   a second fuel dryer portion disposed in the furnace including a grate disposed in a lower portion of the furnace;
   a second duct arranged in fluid communication with the flue to receive a second portion of the flue gas therefrom and to convey the second portion of flue gas therethrough to the second fuel dryer portion;
   a second conveyor to convey the second portion of solid fuel particles to the second fuel dryer portion within the furnace;
   a third conveyor to convey the second portion of solid fuel particles from the second fuel dryer portion to a mill, the mill disposed outside the furnace and configured to reduce a size of the particles of the second portion of solid fuel particles; and
   a fourth conveyor configured to provide the second portion of solid fuel particles from the mill to the furnace for burning by the firing system.

2. The hybrid boiler-dryer of claim 1, wherein the second conveyor is a pressurized duct.

3. The hybrid boiler-dryer of claim 1, wherein the third conveyor is a pressurized duct.

4. The hybrid boiler-dryer of claim 1, wherein the fourth conveyor is a pressurized duct.

5. The hybrid boiler-dryer of claim 1, wherein the second portion of solid fuel particles is provided to the firing system separately from the first portion of solid fuel particles.

6. The hybrid boiler-dryer of claim 1, wherein the second dryer portion further includes a plenum disposed beneath the grate.

7. The hybrid boiler-dryer of claim 6, wherein the second portion of flue gas is provided to the plenum.

8. The hybrid boiler-dryer of claim 1, wherein the second portion of solid fuel particles defines a bed region on the grate and further comprising a dryer device arranged to receive the second fuel portion of solid fuel particles from the bed region on the grate.

9. The hybrid boiler-dryer of claim 8, wherein the dryer device is coupled in fluid communication with the mill and operative to provide the second portion of solid fuel particles thereto.

10. The hybrid boiler-dryer of claim 1, wherein the second fuel dryer portion is coupled in fluid communication with an ash receptacle.

11. A method of operating a furnace having a firing system configured to combust particles of a solid fuel received therein, comprising:
- providing the particles of solid fuel to a sieve;
- separating the solid fuel into a first portion of solid fuel particles and a second portion of solid fuel particles based on a size of the particles of the solid fuel, wherein the size of the particles in the first portion of solid fuel particles are smaller than a predetermined size, and the size of the fuel particles in the second portion of solid fuel particles are larger than a predetermined size;
- directing a flue gas through a flue;
- providing a first portion of the flue gas to a first fuel-dryer comprising a first duct in fluid communication with the flue;
- conveying the first portion of solid fuel particles to the first duct;
- drying the first portion of solid fuel particles in the first duct;
- conveying the first portion of solid fuel particles through the first duct to the furnace;
- combusting the first portion of solid fuel particles with the firing system;
- conveying the second portion of solid fuel particles to a second fuel dryer disposed within a lower portion of the furnace;
- conveying a second portion of the flue gas to the second fuel dryer portion;
- drying the second portion of solid fuel particles with the second fuel dryer portion;
- conveying the second portion of solid fuel particles from the second fuel dryer portion within the furnace to a mill disposed outside of the furnace;
- reducing the size of the particles of the second portion of solid fuel particles with the mill;
- conveying the second portion of solid fuel particles from the mill to the furnace; and
- combusting the second portion of solid fuel particles with the firing system.

12. The method of claim 11, wherein the conveying of the first portion of solid fuel particles to the first duct is via a pressurized duct.

13. The method of claim 11, wherein the conveying of the second portion of solid fuel particles from the second fuel dryer portion within the furnace to the mill is via a pressurized duct.

14. The method of claim 11, wherein the conveying of the second portion of solid fuel particles from the mill to the furnace is via a pressurized duct.

15. The method of claim 11, further comprising conveying the second portion of solid fuel particles to the firing system separately from the first portion of solid fuel particles.

16. The method of claim 11, wherein the second fuel dryer portion comprises a grate disposed in a lower portion of the furnace.

17. The method of claim 16, wherein the second fuel dryer portion includes a plenum disposed beneath the grate.

18. The method of claim 17, wherein the second portion of flue gas is provided to the plenum.

19. The method of claim 16, further comprising conveying the second portion of solid fuel particles from the grate to a dryer device prior to the step of conveying the second portion of fuel to a mill.

20. The method of claim 19, further comprising removing ash particles from the second fuel dryer portion and providing the ash particles to a receptacle coupled thereto.

* * * * *